(12) United States Patent
Park et al.

(10) Patent No.: US 11,620,011 B2
(45) Date of Patent: Apr. 4, 2023

(54) APPARATUS AND METHOD FOR DRIVING DISPLAY

(71) Applicant: SILICON WORKS CO., LTD., Daejeon (KR)

(72) Inventors: Jong Min Park, Daejeon (KR); Seong Sik Yoon, Daejeon (KR); Jung Min Choi, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/367,811

(22) Filed: Jul. 6, 2021

(65) Prior Publication Data

US 2022/0011895 A1  Jan. 13, 2022

(30) Foreign Application Priority Data

Jul. 9, 2020  (KR) .................. 10-2020-0084693

(51) Int. Cl.
*G06F 3/041* (2006.01)
*G09G 3/20* (2006.01)

(52) U.S. Cl.
CPC ........ *G06F 3/0412* (2013.01); *G06F 3/04184* (2019.05); *G09G 3/20* (2013.01); *G09G 2330/021* (2013.01); *G09G 2340/0435* (2013.01)

(58) Field of Classification Search
None
See application file for complete search history.

(56) References Cited

U.S. PATENT DOCUMENTS

| | | | | |
|---|---|---|---|---|
| 10,438,553 B2* | 10/2019 | Kuei | ............ | G09G 3/3688 |
| 10,747,360 B2* | 8/2020 | Park | ............ | G06F 3/0412 |
| 2014/0168187 A1* | 6/2014 | Qu | ............ | G09G 3/3618 |
| | | | | 345/212 |
| 2015/0346887 A1* | 12/2015 | Cho | ............ | G06F 3/04166 |
| | | | | 345/174 |
| 2018/0374443 A1* | 12/2018 | Kuei | ............ | G09G 3/3688 |
| 2020/0251068 A1* | 8/2020 | Chen | ............ | G09G 3/3233 |

FOREIGN PATENT DOCUMENTS

EP   0067384 A2 * 12/1982
KR   10-1615813 B1    5/2016

* cited by examiner

*Primary Examiner* — Dorothy Harris
(74) *Attorney, Agent, or Firm* — Harness, Dickey & Pierce, P.L.C.

(57) ABSTRACT

A display driving device capable of operating a source driver integrated circuit (IC) in a low power mode during a touch sensing period includes a source driver IC configured to operate in a first low power mode in which an analog data processing unit is deactivated or operate in a second low power mode in which both of the analog data processing unit and a digital data processing unit are deactivated, during a touch sensing period of a first frame; and a readout IC configured to supply touch sensor driving signals to touch sensors during the touch sensing period and receive touch sensing data from the touch sensors according to the touch sensor driving signals.

17 Claims, 8 Drawing Sheets

APPARATUS AND METHOD FOR DRIVING DISPLAY

CROSS-REFERENCE TO RELATED APPLICATIONS

This application claims the benefit of the Korean Patent Application No. 10-2020-0084693 filed on Jul. 9, 2020 which is hereby incorporated by reference as if fully set forth herein.

FIELD

The present disclosure relates to a display driving device, and more particularly, to a display driving device with reduced power consumption.

BACKGROUND

As the information society develops, the demand for display devices for displaying images is increasing in various forms. Recently, various types of display devices such as liquid crystal display (LCD) devices or organic light-emitting diode (OLED) display devices have been used.

Recently, moving away from the conventional input methods such as buttons, keyboards, and mouses, display devices having touch screen panels (hereinafter referred to as "touch display devices") capable of detecting a touch input by a user's finger or a stylus pen are widely used.

The display driving device for driving the touch display device additionally performs a function of detecting the presence or absence of a touch and touch coordinates (or a touch position) in addition to the general function of driving the touch display device. Specifically, the display driving device detects a touch sensing signal by driving touch sensors (or touch electrodes) and detects touch information including the touch coordinates or the presence or absence of a touch using the detected touch sensing signal.

In particular, in the case of a touch display device in which a touch screen panel is integrated with a display panel, as shown in FIG. 1A or 1B, the display driving device may be driven during one frame period 1F by time-dividing the one frame period 1F into a display period DP (DP1 to DPn) in which input image data is output to the display panel and a touch sensing period TP (TP1 to TPm) in which touch sensors are driven to detect touch information.

The display driving device, which is driven in a time division manner, may drive a source driver integrated circuit (IC) to allow the input image data to be output to the display panel during the display period DP (DP1 to DPn) and may drive a touch IC to allow touch information to be detected during the touch sensing period TP (TP1 to TPm).

However, in the case of the display driving device driven in a time division manner, even though the source driver IC does not need to operate during the touch sensing period TP (TP1 to TPm), the source driver IC consumes a static current and a dynamic current such that a clock training signal transmitted from a timing controller is received during the touch sensing period TP (TP1 to TPm), resulting in a problem of increased power consumption.

SUMMARY

Accordingly, the present disclosure has been made in an effort to solve the above-described problems, and a technical objective of the present disclosure is to provide an apparatus and a method for driving a display, which are capable of operating a source driver integrated circuit (IC) in a low power mode during a touch sensing period.

In addition, another technical objective of the present disclosure is to provide an apparatus and a method for driving a display, which are capable of operating a source driver IC in a low power mode according to image data displayed during a display period.

In addition, still another technical objective is to provide an apparatus and a method for driving a display, which allows a timing controller to omit the transmission of clock training data during a touch sensing period.

According to one aspect of the present disclosure, there is provided a display driving device including a source driver IC configured to operate in a first low power mode in which an analog data processing unit is deactivated or operate in a second low power mode in which both of the analog data processing unit and a digital data processing unit are deactivated, during a touch sensing period of a first frame; and a readout IC configured to supply touch sensor driving signals to touch sensors during the touch sensing period and receive touch sensing data from the touch sensors according to the touch sensor driving signals.

According to another aspect of the present disclosure, there is provided a display driving method including, during a display period of a first frame, driving a source driver integrated circuit (IC) in a normal mode in which a digital data processing unit and an analog data processing unit are activated to output image data to a display panel; and during a touch sensing period of the first frame, driving the source driver IC in a first low power mode in which the analog data processing unit is deactivated or in a second low power mode in which the analog data processing unit and a digital data processing unit are deactivated.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1A:
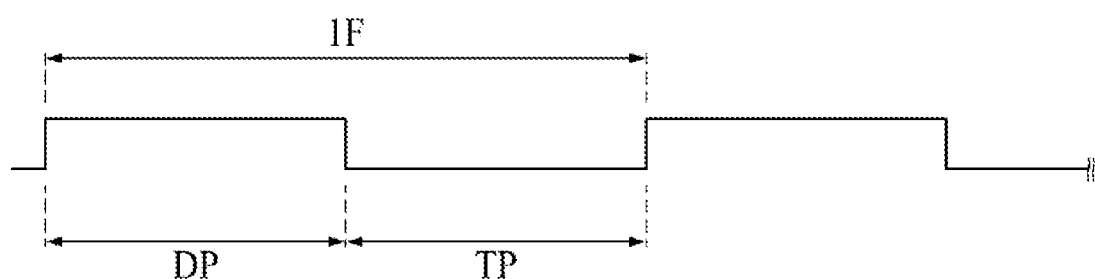
FIGS. 1A and 1B are diagrams illustrating a display period and a touch sensing period of one frame when a general touch display device operates in a time division manner.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only-' is used. The terms of a singular form may include plural forms unless referred to the contrary.

In construing an element, the element is construed as including an error range although there is no explicit description.

In describing a time relationship, for example, when the temporal order is described as 'after~', 'subsequent~', 'next~', and 'before~' a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can suffi-ciently understand. The embodiments of the present disclosure may be carried out independently from each other, or may be carried out together in co-dependent relationship.

Hereinafter, embodiments of this specification will be described in detail with reference to the accompanying drawings.

Figure 2:
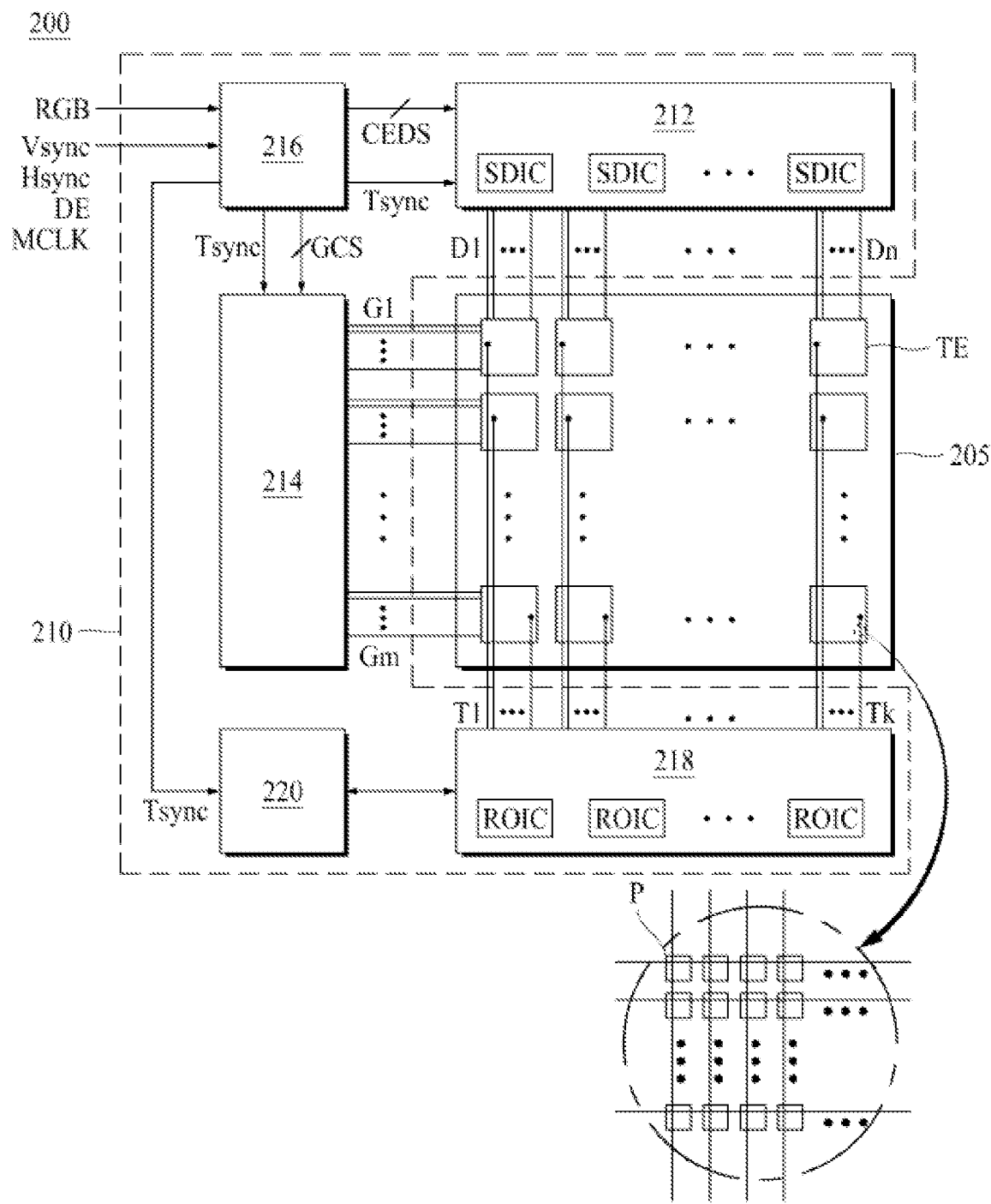
FIG. 2 is a block diagram illustrating a touch display device according to one embodiment of the present disclosure.

FIG. 2 is a block diagram illustrating a touch display device according to one embodiment of the present disclosure. A touch display device 200 according to one embodiment of the present disclosure performs a display function and a touch sensing function and may be implemented as a flat panel display device such as a liquid crystal display (LCD) device or an organic light-emitting diode (OLED) display device.

The touch display device 200 according to the present disclosure may include a capacitive-type touch screen for sensing a touch due to a contact with a conductive object such as a finger or an active pen. The capacitive-type touch screen may be formed in the form of being independent from a display panel for implementing a display or may be formed in the form in which touch sensors (or touch electrodes) are embedded in a pixel array of the display panel.

As shown in FIG. 2, the touch display device 200 according to the present disclosure includes a display panel 205 and a display driving device 210 for driving the display panel 205.

The display panel 205 displays an image of predetermined grayscale or receives a touch using a finger or an active pen. In one embodiment, the display panel 205 may be a display panel having an in-cell touch type structure using a capacitive scheme. According to one embodiment, the display panel 205 may be an in-cell touch type display panel using a self-capacitive scheme or an in-cell touch type display panel using a mutual capacitive scheme. Hereinafter, for convenience of description, a description will be made by assuming that the display panel 205 is an in-cell touch type display panel using a self-capacitive scheme.

The display panel 205 operates in a display mode and a touch sensing mode. The display panel 205 operates in the display mode during a display period to display an image using light emitted from a backlight unit (not shown) and operates in the touch sensing mode during a touch sensing period to serve as a touch panel for touch sensing.

Figure 1B:
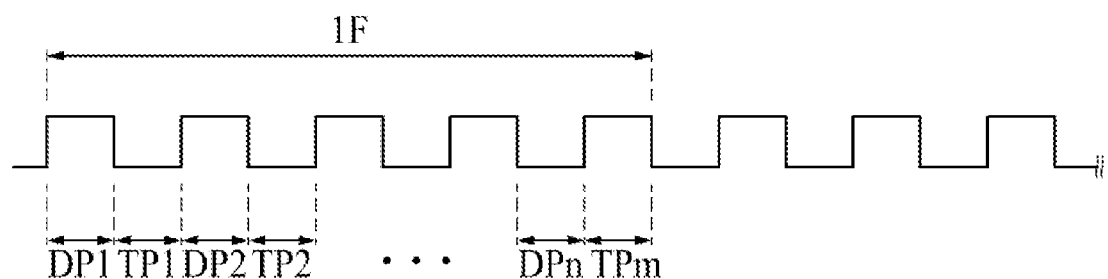

In one embodiment, the display mode may be maintained in the above-described display period DP set in one frame as shown in FIG. 1A or may be maintained in each of the plurality of display periods DP1 to DPn set in one frame as shown in FIG. 1B. In addition, the touch sensing mode may be maintained in the touch sensing period TP set in one frame as shown in FIG. 1A or may be maintained in each of the plurality of sensing periods TP1 to TPm set between the plurality of display periods DP1 to DPn in one frame as shown in FIG. 1B. In this case, for high resolution implementation, in one frame, a length of the display period DP may be set to be longer than a length of the touch sensing period TP or the number of the display periods DP1 to DPn may be greater than the number of the touch sensing periods TP1 to TPm.

The display panel 205 includes a plurality of data lines D1 to Dn, a plurality of gate lines G1 to Gm, a plurality of pixels P, a plurality of touch sensors TE, and a plurality of touch lines T1 to Tk.

In the display mode, each of the plurality of data lines D1 to Dn receives a data signal. In the display mode, each of the plurality of gate lines G1 to Gm receives a scan pulse. Each of the plurality of data lines D1 to Dn and each of the plurality of gate lines G1 to Gm are disposed to intersect each other on a substrate, thereby defining a plurality of pixel regions. Each of the plurality of pixels P may include a thin film transistor (not shown) connected to an adjacent gate line and an adjacent data line, a pixel electrode (not shown) connected to the thin film transistor, and a storage capacitor (not shown) connected to the pixel electrode.

Each of the plurality of touch sensors TE may serve as a touch electrode for sensing a touch using a finger or an active pen or serve as a common electrode for driving a liquid crystal by forming an electric field together with the pixel electrode. That is, each of the plurality of touch sensors TE is used as a touch electrode in the touch sensing mode and used as a common electrode in the display mode. Since each of the plurality of touch sensors TE is also used as a common electrode for driving a liquid crystal, each of the plurality of touch sensors TE may be made of a transparent conductive material.

Since each of the plurality of touch sensors TE is used as a self-capacitive type touch sensor in the touch sensing mode, each of the plurality of touch sensors TE should have a size that is greater than a minimum contact size between the touch object and the display panel 205. Accordingly, each of the plurality of touch sensors TE may have a size corresponding to one or more pixels P. In one embodiment, the plurality of touch sensors TE may be disposed at regular intervals along a plurality of horizontal lines and a plurality of vertical lines.

Each of the plurality of touch lines T1 to Tk are individually connected to each of the plurality of touch sensors TE. During the display period DP shown in FIG. 1A or the display periods DP1 to DPn shown in FIG. 1B of the one frame period 1F, each of the plurality of touch lines T1 to Tk supplies a common voltage Vcom to a corresponding touch sensor TE.

The display driving device 210 displays an image through the display panel 205 by supplying data signals to the plurality of pixels P included in the display panel 205 during the display periods DP1 to DPn (hereinafter referred to as "DP") and senses a touch through the touch sensors TE during the touch sensing periods TP1 to TPm.

To this end, the display driving device 210 may include a data driving circuit 212, a gate driving circuit 214, a timing controller 216, a touch driving circuit 218, and a touch controller 220.

The data driving circuit 212 receives a clock embedded data signaling (CEDS) packet from the timing controller 216 during the display period DP and acquires a clock, control data, and digital image data from the CEDS packet. Here, the CEDS packet means a packet in which a clock is embedded between pieces of data.

The data driving circuit 212 converts the acquired digital image data into analog data signals and supplies the analog data signals to the pixels P through the plurality of data lines D1 to Dn.

Figure 3:
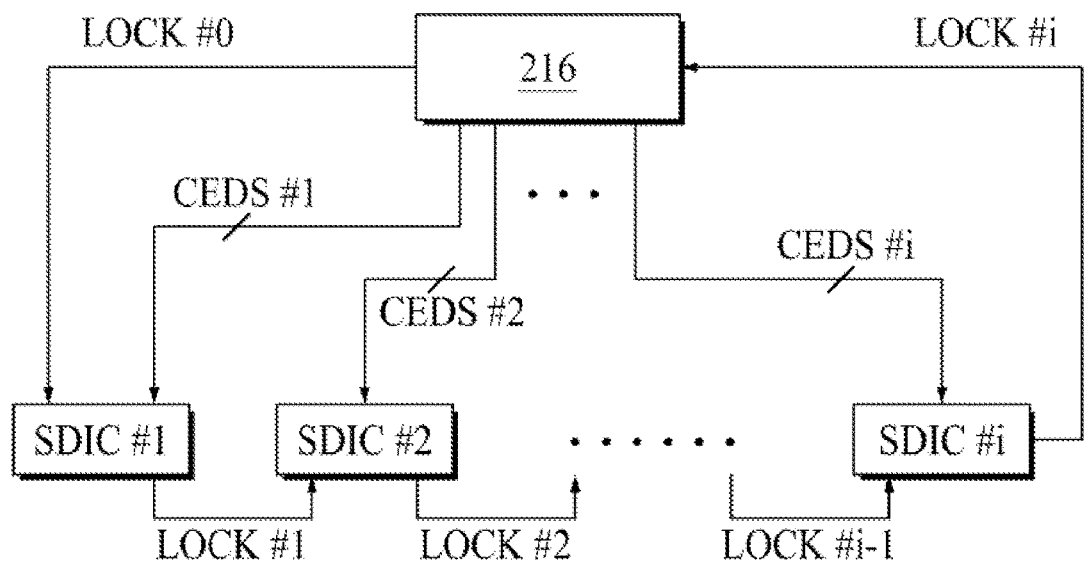
FIG. 3 is a block diagram illustrating a connection relationship between a timing controller and a source driver integrated circuit (IC) according to one embodiment of the present disclosure.

To this end, as shown in FIG. 3, the data driving circuit 212 includes a plurality of source driver integrated circuits (ICs) SDIC #1 to SDIC #i. In one embodiment, the source driver ICs SDIC #1 to SDIC #i are connected in a cascade manner and are connected in a point-to-point form to the timing controller 216 through CEDS line pairs CEDS #1 to CEDS #i, and each of the source driver ICs SDIC #1 to SDIC #i receives CEDS packets from the timing controller 216.

Figure 4:
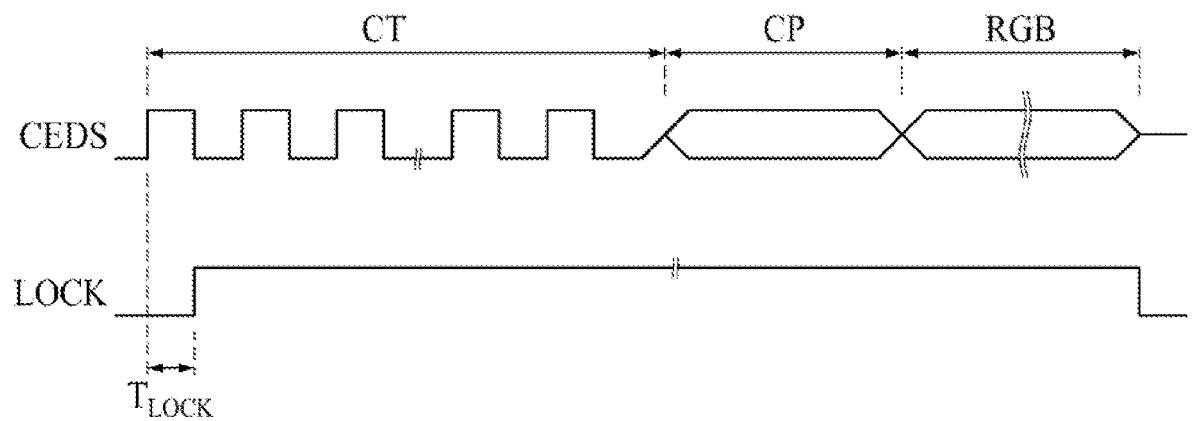
FIG. 4 is a diagram illustrating a waveform of a clock embedded data signaling (CEDS) packet and a waveform of a LOCK signal which are transmitted from the timing controller to the source driver IC according to the present disclosure.

Specifically, as shown in FIG. 4, each of the source driver ICs SDIC #1 to SDIC #i receives a CEDS packet including clock training data CT for a clock recovery and, when the clock recovery is completed, each of the source driver ICs SDIC #1 to SDIC #i sequentially receives a CEDS packet including control data CP and digital image data RGB.

Figure 5:
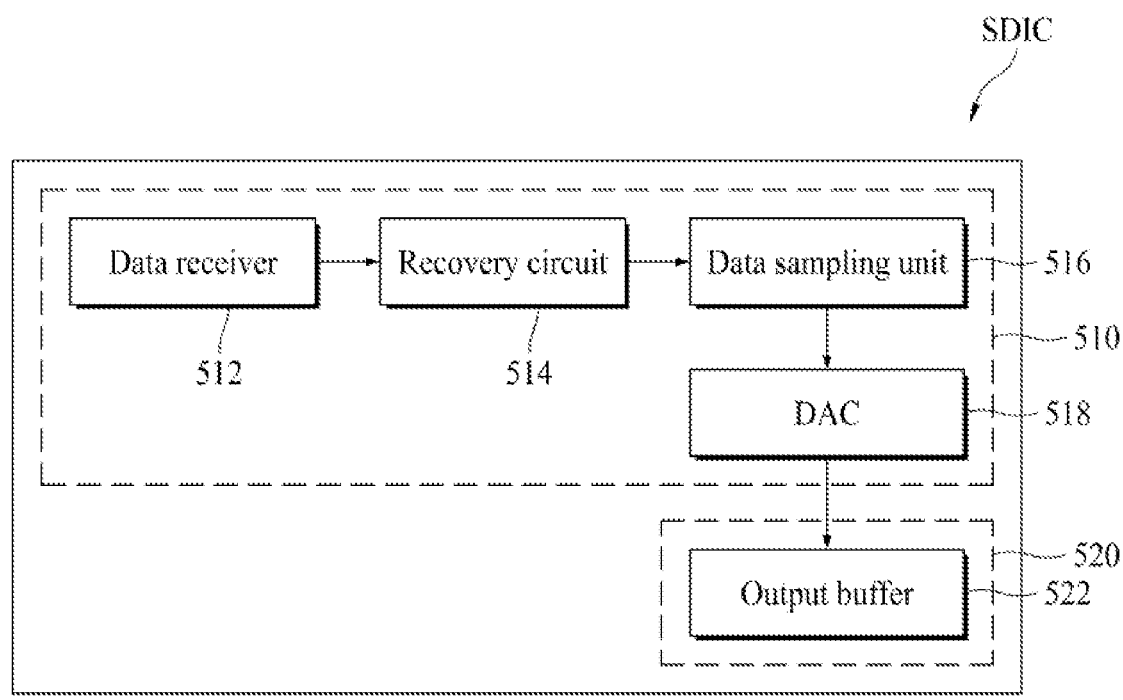
FIG. 5 is a schematic block diagram illustrating a configuration of the source driver IC according to one embodiment of the present disclosure.

In one embodiment, as shown in FIG. 5, each of the source driver ICs SDIC #1 to SDIC #i includes a digital data processing unit 510 and an analog data processing unit 520.

The digital data processing unit 510 receives and analyzes the CEDS packet from the timing controller 216, latches the digital image data RGB in predetermined units according to a sampling signal, and then converts the digital image data RGB into an analog data signal. To this end, the digital data processing unit 510 includes a data receiver 512, a recovery circuit 514, a data sampling unit 516, and a digital-analog converter (DAC) 518.

The data receiver 512 receives the CEDS packet supplied as a differential signal pair through the CEDS line pair. In one embodiment, the data receiver 512 may be implemented as a reception buffer.

The recovery circuit 514 recovers a clock, which is to be used for data sampling, using the clock training data CT included in the CEDS packet. When recovery of the clock is completed, the recovery circuit 514 recovers the control data CP and the digital image data RGB from the CEDS packet on the basis of the recovered clock.

Specifically, when the recovery circuit 514 receives a high-level LOCK signal LOCK #0 from the timing controller 216 or a high-level LOCK signal from another source driver IC SDIC through the data receiver 512, the recovery circuit 514 recovers the clock, which is to be used for data sampling, from the CEDS packet. When a phase and a frequency of the recovered clock are fixed and thus the clock is stabilized, as shown in FIG. 4, the recovery circuit 514 outputs a high-level LOCK signal to the outside. In this case, when the source driver IC SDIC including the recovery circuit 514 is the last source driver IC SDIC #i, the recovery circuit 514 outputs a high-level LOCK signal LOCK #i to the timing controller 216. When the source driver IC SDIC including the recovery circuit 514 is not the last source driver IC SDIC #i, the recovery circuit 514 outputs a high-level LOCK signal to another source driver IC SDIC.

When a low-level LOCK signal is received from the outside, the recovery circuit 514 outputs a low-level LOCK signal to the outside even when the clock recovered in the recovery circuit 514 is stabilized. Accordingly, when even one clock among the clocks of the plurality of source driver ICs SDIC #1 to SDIC #i is not stabilized, since a low-level LOCK LOCK #i is finally output to the timing controller 216, until the clocks of all the source driver ICs SDIC #1 to SDIC #i are stabilized, the timing controller 216 transmits the CEDS packet including the clock training data CT to the source driver ICs SDIC #1 to SDIC #i, and each of the source driver ICs SDIC #1 to SDIC #i resumes clock training.

Meanwhile, when the recovery of the clock is completed according to the clock training, the recovery circuit 514 recovers the control data CP and the digital image data RGB from the CEDS packet received through the data receiver 512 and transmits the recovered control data CP and the recovered digital image data RGB to the data sampling unit 516.

In one embodiment, the control data CP recovered by the recovery circuit 514 may include at least one among a polarity control signal POL, a source start pulse SSP, a source sampling clock SSC, a source output enable signal SOE, first operating mode setting information, and second operating mode setting information.

Figure 6A:
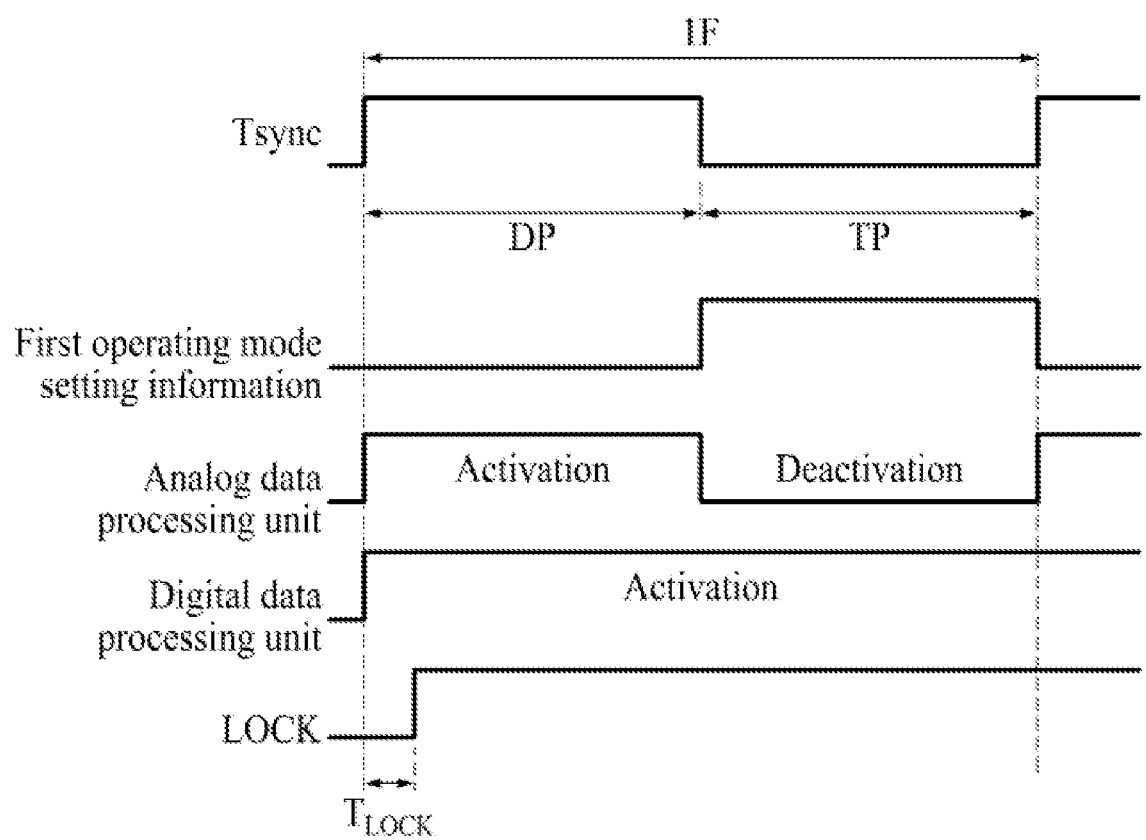
FIG. 6A is a diagram illustrating a waveform of each signal when the source driver IC operates in a first low power mode.

In this case, the first operating mode setting information means information for setting the source driver IC SDIC to a first low power mode during the touch sensing period TP. The first low power mode refers to a power mode in which the analog data processing unit 520 of the source driver IC SDIC is deactivated to reduce a static current and a dynamic current which are consumed in the source driver IC SDIC. Specifically, as shown in FIG. 6A, during a touch sensing period TP following a corresponding display period DP, when the first operating mode setting information is set to a high level, the recovery circuit 514 deactivates the analog data processing unit 520 and maintains the digital data processing unit 510 in an active state, thereby allowing the source driver IC SDIC to operate in the first low power mode.

When the source driver IC SDIC operates in the first low power mode, since only the analog data processing unit 520 is deactivated and the digital data processing unit 510 is activated, the static current and the dynamic current are consumed due to the operation of the digital data processing unit 510. However, since the clock training data CT of the CEDS packet may be received normally from the timing controller 216, the clock training may be performed. Thus, there is an advantage in that, after the touch sensing period TP, the display period DP may start and, simultaneously, the CEDS packet may be received normally.

Figure 6B:
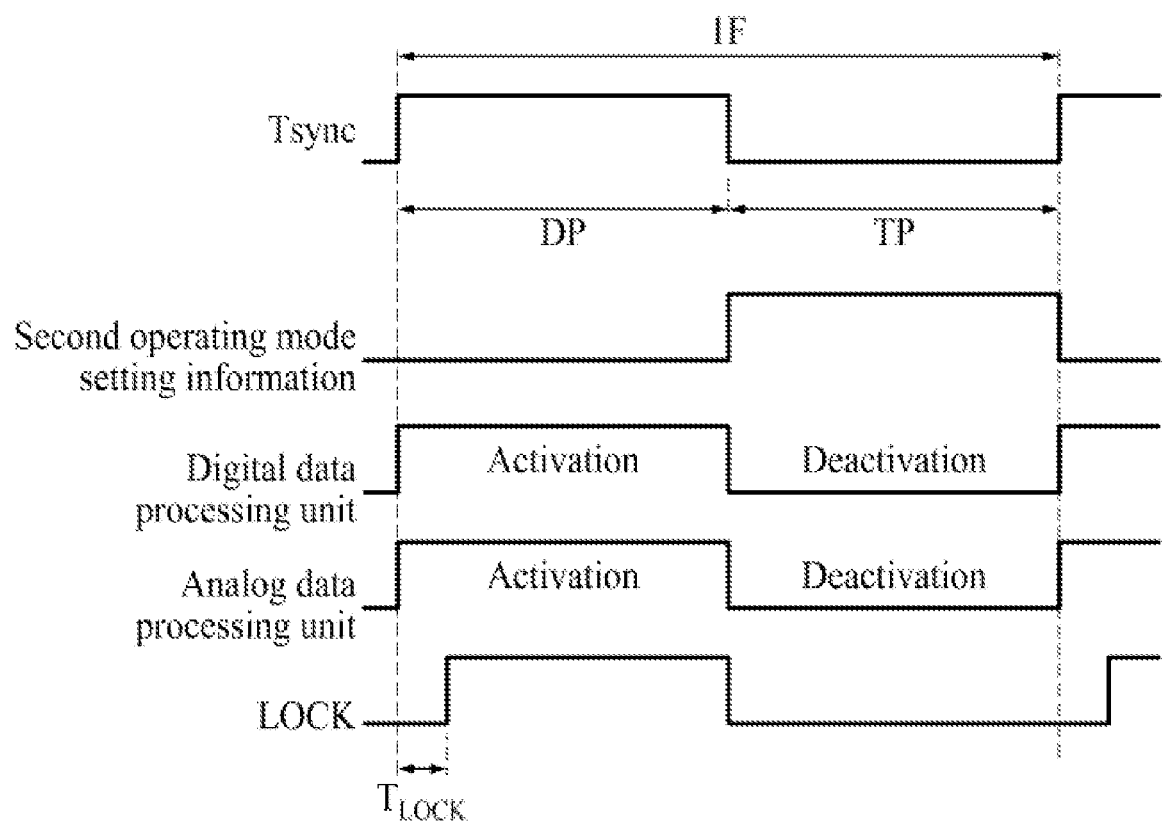
FIG. 6B is a diagram illustrating a waveform of each signal when the source driver IC operates in a second low power mode.

The second operating mode setting information means information for setting the source driver IC SDIC to a second low power mode during the touch sensing period TP. The second low power mode means a power mode in which both of the analog data processing unit 520 and the digital data processing unit 510 of the source driver IC SDIC are deactivated to further reduce the static current and the dynamic current which are consumed in the source driver IC SDIC. Specifically, as shown in FIG. 6B, during a touch sensing period TP following a corresponding display period DP, when the second operating mode setting information is set to a high level, the recovery circuit 514 deactivates both of the digital data processing unit 510 and the analog data processing unit 520, thereby allowing the source driver IC SDIC to operate in the second low power mode.

When the source driver IC SDIC operates in the second low power mode, since not only the analog data processing unit 520 but also the digital data processing unit 510 are deactivated, the source driver IC SDIC may not receive the CEDS packet from the timing controller 216. Thus, since the display period DP should start after the touch sensing period TP and then the clock training may be performed, the digital image data RGB may not be received normally with the starting of the display period DP. But there is an advantage in that consumption of the static current and the dynamic current is reduced when compared with the first low power mode.

In one embodiment, when digital image data RGB corresponding to the last horizontal line of the CEDS packet is transmitted, the first and second operating mode setting information may be included in control data CP mapped to the corresponding digital image data RGB. According to the example, when outputting of a data signal corresponding to the corresponding digital image data RGB is completed, the recovery circuit 514 may enter the first or second low power mode.

Meanwhile, when both of the first operating mode setting information and the second operating mode setting information are set to a low level, during a touch sensing period TP following a corresponding display period DP, the recovery circuit 514 activates both of the digital data processing unit 510 and the analog data processing unit 520, thereby allowing the source driver IC SDIC to operate in a normal mode.

When the source driver IC SDIC operates in the first low power mode or the second low power mode during the touch sensing period TP, the recovery circuit 514 monitors a touch synchronization signal Tsync. When the touch synchronization signal Tsync is changed a high level, the recovery circuit 514 determines that the display period DP starts and activates the analog data processing unit 520 or the digital data processing unit 510, which was deactivated, again, thereby allowing the source driver IC SDIC operates in the normal mode.

As described above, according to the present disclosure, on the basis of the first operating mode setting information or the second operating mode setting information, which is included in the control data CP recovered by the recovery circuit 514, the source driver IC SDIC may operate in the first low power mode or the second low power mode during the touch sensing period TP so that it is possible to reduce power consumption of the source driver IC SDIC.

Referring to FIG. 5 again, the data sampling unit 516 generates a sampling clock on the basis of the control data CP transmitted from the recovery circuit 514, sequentially latches digital image data RGB corresponding to one horizontal line, which is provided from the recovery circuit 514, according to the sampling clock, and then outputs the digital image data RGB corresponding to one horizontal line to the DAC 518. To this end, the data sampling unit 516 may include a shift register (not shown) for sequentially generating the sampling clock by shifting the source start pulse SSP included in the control data CP according to the source sampling clock SSC, and a latch (not shown) for sequentially latching the digital image data RGB according to the sampling clock.

In response to the polarity control signal POL, the DAC 518 converts the pieces of the digital image data RGB output from the data sampling unit 516 into an analog data signal having positive polarity or an analog data signal having negative polarity and transmits the analog data signal to the analog data processing unit 520.

The analog data processing unit 520 outputs the analog data signal generated by the digital data processing unit 510 to the display panel 205. In one embodiment, the analog data processing unit 520 may include an output buffer 522. The output buffer 522 outputs data signals to the data lines D1 to Dn during a period in which the source output enable signal SOE is at a low level and supplies a charge share voltage or a common voltage Vcom to the data lines D1 to Dn during a period in which the source output enable signal SOE is at a high level.

Referring to FIG. 2 again, the gate driving circuit 214 generates gate pulses (or scan pulses) synchronized with the data signals under the control of the timing controller 216 during the display period DP and shifts and sequentially supplies the generated gate pulses to the gate lines G1 to Gm. To this end, the gate driving circuit 214 may include a plurality of gate driver ICs (not shown). During the display period DP, the gate driver ICs sequentially supply the gate pulses synchronized with the data signals to the gate lines G1 to Gm under the control of the timing controller 216 to select a data line to which the data signal is written. The gate pulse swings between a gate high voltage VGH and a gate low voltage VGL.

During the touch sensing period TP, the gate driving circuit 214 may supply the gate low voltage VGL to the gate lines G1 to Gm without generating the gate pulses. Accordingly, the gate lines G1 to Gm supply the gate pulses to the TFTs of each pixel to sequentially select a data line to which the data signal is to be written in the display panel 205 during the display period DP and are maintained at the gate low voltage VGL during the touch sensing period TP to prevent an output variation of the touch sensors TE.

The timing controller 216 encodes the control data CP for controlling an operation timing of the source driver IC SDIC using a timing signal input from an external host system (not shown) and transmits the encoded control data CP to the source driver IC SDIC through the CEDS line pair. In one embodiment, the timing signal may include at least one among a vertical synchronization signal Vsync, a horizontal synchronization signal Hsync, a data enable signal DE, and a main clock MCLK.

In one embodiment, the control data CP for controlling the operation timing of the source driver IC SDIC includes the polarity control signal POL, the source start pulse SSP, the source sampling clock SSC, the source output enable signal SOE, and the first operating mode setting information and the second operating mode setting information for setting an operating mode of the source driver IC SDIC.

As described above, the first operating mode setting information represents information for operating the source driver IC SDIC in the first low power mode by deactivating the analog data processing unit 520 of the source driver IC SDIC during the touch sensing period TP. In order to operate the source driver IC SDIC in the first low power mode, the timing controller 216 may set the first operating mode setting information to a high level.

The second operating mode setting information represents information for operating the source driver IC SDIC in the second low power mode by deactivating both of the digital data processing unit 510 and the analog data processing unit 520 of the source driver IC SDIC during the touch sensing period TP. In order to operate the source driver IC SDIC in the second low power mode, the timing controller 216 may set the second operating mode setting information to a high level.

In addition, the timing controller 216 may transmit control data CP for controlling an operation timing of the gate driving circuit 214 to the gate driving circuit 214 using the timing signal input from the external host system. The control data CP for controlling the operation timing of the gate driving circuit 214 may include at least one among a gate start pulse GSP, a gate shift clock GSC, and a gate output enable signal GOE.

Meanwhile, the timing controller 216 may compress an external data enable signal transmitted from the external host system within a preset display period DP, thereby generating an internal data enable signal iDE. The timing controller 216 may generate the touch synchronization signal Tsync for time-dividing one frame period into the display period DP and the touch sensing period TP according to timings of the vertical synchronization signal Vsync and the internal data enable signal iDE. The timing controller 216 may transmit the touch synchronization signal Tsync to the data driving circuit 212, the gate driving circuit 214, the touch driving circuit 218, and the touch controller 220.

When the internal data enable signal iDE starts to be generated, the timing controller 216 generates a CEDS packet in the form of the differential signals CEDA and CEDB in which a clock is embedded between pieces of data and transmits the CEDS packet to the source driver IC SDIC.

Specifically, during the display period DP, the timing controller 216 transmits a signal LOCK #0 for clock synchronization and clock training data CT according to a CEDS interface protocol to the source driver IC SDIC. When a high-level LOCK signal LOCK #i is received from the last source driver IC SDIC #i among the source driver ICs SDIC, the timing controller 216 transmits the CEDS packet in the order of the control data CP and the digital image data RGB to the source driver IC SDIC. In this case, as shown in FIG. 4, the LOCK signal is reversed to the high level after a LOCK stabilization time Tlock, which is a time from when the clock training data CT starts to be transmitted to the source driver IC SDIC until an output of the recovery circuit 514 of the source driver IC SDIC is stably fixed, elapses.

On the other hand, when a low-level LOCK signal LOCK #i is received from the last source driver IC SDIC #i, the timing controller 216 transmits the clock training data to the source driver IC SDIC again to resume the clock training of the source driver IC SDIC.

In one embodiment, when the source driver ICs SDIC operate in the first low power mode or the second low power mode during the touch sensing period TP, the timing controller 216 may not transmit the CEDS packet to the source driver IC SDIC. Consequently, the timing controller 216 can reduce power consumption required for transmitting the CEDS packet during the touch sensing period TP.

Specifically, when the source driver ICs SDIC operate in the first low power mode or the second low power mode, the timing controller 216 may set a first voltage $V_{CEDN}$ and a second voltage $V_{CEDP}$ for generating the clock training data to the same level, thereby setting an input of the source driver IC SDIC to a high-impedance Hi-Z state or allowing the clock training data to be consistently maintained at a predetermined level, thereby preventing the occurrence of toggling and preventing the clock training data from being transmitted.

Meanwhile, when the source driver IC SDIC should be driven in the second low power mode during the touch sensing period TP, the timing controller 216 according to the present disclosure may monitor whether the source driver IC SDIC is operating in the second low power mode on the basis of a level of the LOCK signal transmitted from the source driver IC SDIC.

Specifically, as shown in FIG. 6B, when the source driver IC SDIC operates in the second low power mode during the touch sensing period TP, since the digital data processing unit 510 is deactivated and thus a phase and a frequency of the clock may not be fixed, a low-level LOCK signal is output. Accordingly, during the touch sensing period TP, when a level of the LOCK signal transmitted from the source driver IC SDIC is low, the timing controller 216 determines that the source driver IC SDIC is operating in the second low power mode. However, during the touch sensing period TP, when the level of the LOCK signal transmitted from the source driver IC SDIC is high, the timing controller 216 may determine that the source driver IC SDIC is not operating in the second low power mode to set the second operating mode setting information, which is to be included in the control data CP of the CEDS packet in a next display period DP, to a high level again or request a setting of the second low power mode through the touch controller 220 which will be described below.

The host system converts the digital image data RGB into a format suitable for being displayed on the display panel 205. The host system transmits the timing signals together with the digital image data RGB to the timing controller 216. The host system is implemented as any one among a television system, a set-top box, a navigation system, a digital versatile disc (DVD) player, a Blu-ray player, a personal computer (PC), a home theater system, and a phone system and receives an input image.

Meanwhile, the host system may receive touch input coordinates from the touch controller 220 and execute an application program related to the received touch input coordinates.

The touch driving circuit 218 drives the touch sensors TE during the touch sensing period TP to acquire touch sensing data from the touch sensors TE. To this end, the touch driving circuit 218 may include a plurality of readout ICs ROIC.

In one embodiment, when the display panel 205 is implemented as a mutual capacitive type display panel, the readout IC ROIC may include a driving circuit for generating touch driving signals for driving the touch sensors TE to supply the touch driving signals to the touch sensors TE through the touch lines T1 to Tk, and a sensing circuit for detecting a variation in capacitance of the touch sensors TE through the touch lines T1 to Tk to generate touch sensing signals (touch raw data).

In another example, when the display panel 205 is implemented as a self-capacitive type display panel, by using a single circuit, the readout IC ROIC may supply touch driving signals to the touch sensors TE and acquire touch sensing signals from the touch sensors TE.

Meanwhile, the readout IC ROIC supplies a common voltage Vcom to the touch sensors TE through the touch lines T1 to Tk during the display period DP. Accordingly, the touch sensor TE serves as a common electrode during the display period DP.

In addition, in the above-described embodiment, although the source driver IC SDIC and the readout IC ROIC have been illustrated as being implemented in separate components, in another embodiment, the source driver IC SDIC and the readout IC ROIC may be implemented in the form of being integrated on a single chip SRIC.

The touch controller 220 may analyze the touch sensing data received from the readout IC ROIC using a preset touch recognition algorithm, determine the touch sensing data that is greater than or equal to a predetermined threshold voltage as touch input data, and calculate coordinate values of a touch input position. Coordinate information of the touch input position output from the touch controller 220 is transmitted to the host system.

In the above-described embodiment, the timing controller 216 has been described as transmitting the second operating mode setting information, which is for setting the second low power mode of the source driver IC SDIC, to the source driver IC SDIC. In a modified embodiment, the touch controller 220 may transmit the second operating mode setting information, which is for setting the second low power mode of the source driver IC SDIC, to the source driver IC SDIC.

According to such an embodiment, the second operating mode setting information may be included in readout IC control data for controlling the readout IC ROIC, the touch controller 220 may transmit the readout IC control data including the second operating mode setting information to the readout IC ROIC, and the readout IC ROIC may acquire the second operating mode setting information from the readout IC control data to transmit the acquired second operating mode setting information to the source driver IC SDIC.

Figure 7:
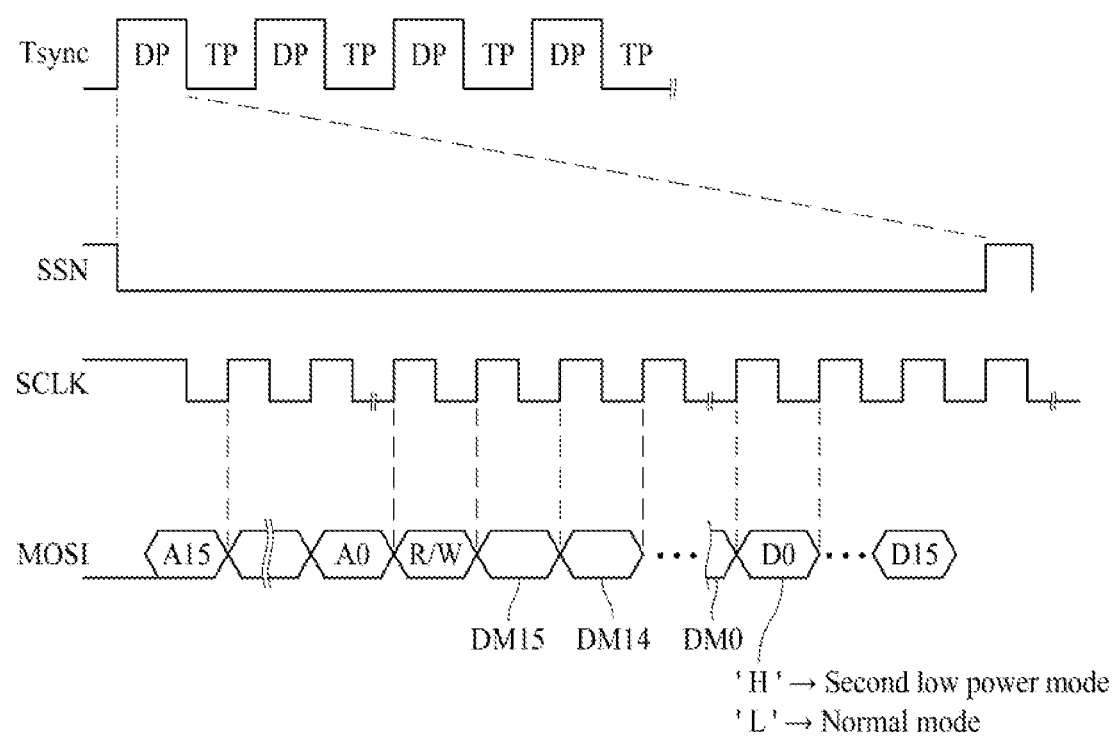
FIG. 7 is a diagram illustrating waveforms of signals transmitted and received between a touch controller and a readout IC.

Specifically, the touch controller 220 communicates with the readout IC ROIC using a serial peripheral interface (SPI) protocol, and when the readout IC control data is transmitted, the touch controller 220 operates as a master and the readout IC ROIC operates as a slave. In this case, as shown in FIG. 7, the touch controller 220 may transmit addresses A15 to A0, a command R/W, pieces of dummy data DM15 to DM0, and pieces of second operating mode setting information D0 to D15 through a master output slave input (MOSI) line. In this case, when the source driver IC SDIC should operate in the second low power mode, the pieces of second operating mode setting information D0 to D15 may be set to a high level and, when the source driver IC SDIC should operate in the normal mode, the pieces of second operating mode setting information D0 to D15 may be set to a low level.

In addition, as described above, although the timing controller 216 transmits the second operating mode setting information to the source driver IC SDIC, when a feedback LOCK signal is at a high level, the timing controller 216 may determine that the source driver IC SDIC does not operate in the second low power mode and then request the touch controller 220 to set the source driver IC SDIC to the second low power mode. According to the above request, the touch controller 220 may transmit the readout IC control data, which is for controlling the readout IC ROIC, including the second operating mode setting information to the readout IC ROIC.

Meanwhile, in the above-described embodiment, the source driver IC SDIC has been described as operating in the first low power mode or the second low power mode during only the touch sensing period TP.

However, in another embodiment, the source driver IC SDIC may operate in the first low power mode even during the display period DP. Specifically, when a still image is displayed over a plurality of frames or a frame rate of image data is changed from a first frame rate to a second frame rate that is lower than the first frame rate, the source driver IC SDIC may operate in the first low power mode during the display period DP.

According to the present embodiment, during the display period DP, the timing controller 216 sets third operating mode setting information for operating the source driver IC SDIC in the first low power mode to a high level, includes the third operating mode setting information in the control data CP of the CEDS packet, and then transmits the CEDS packet. When the third operating mode setting information is included in the control data CP of the CEDS packet received from the timing controller 216 and is set to a high level, the source driver IC SDIC deactivates the analog data processing unit 520 during the display period DP to operate in the first low power mode.

In the above-described embodiment, it has been described that, when the touch synchronization signal Tsync is changed to a high level while operating in the first or second low power mode, the source driver IC SDIC wakes up to operate in the normal mode. However, in another embodiment, the timing controller 216 may separately generate a wake-up control signal for waking the source driver IC SDIC up, and the source driver IC SDIC may additionally include a separate input pin for receiving the wake-up control signal from the timing controller 216 to receive the wake-up control signal from the timing controller 216 through the separate input pin.

In the present embodiment, the reason why the source driver IC SDIC receives the wake-up control signal from the timing controller 216 through the separate input pin is that, when the source driver IC SDIC operates in the second low power mode, the source driver IC SDIC does not perform the clock training during the touch sensing period TP such that, even when the display period DP starts, a predetermined time is inevitably required until the image data is output. Therefore, when the wake-up control signal is received through the separate input pin, even during the touch sensing period TP, the source driver IC SDIC may wake-up to be changed from the second low power mode to the normal mode, thereby activating the digital data processing unit 510 and resuming the clock training to process the image data at the same time as the start of the display period DP.

Hereinafter, a display driving method according to the present disclosure will be described with reference to FIG. 8.

Figure 8:
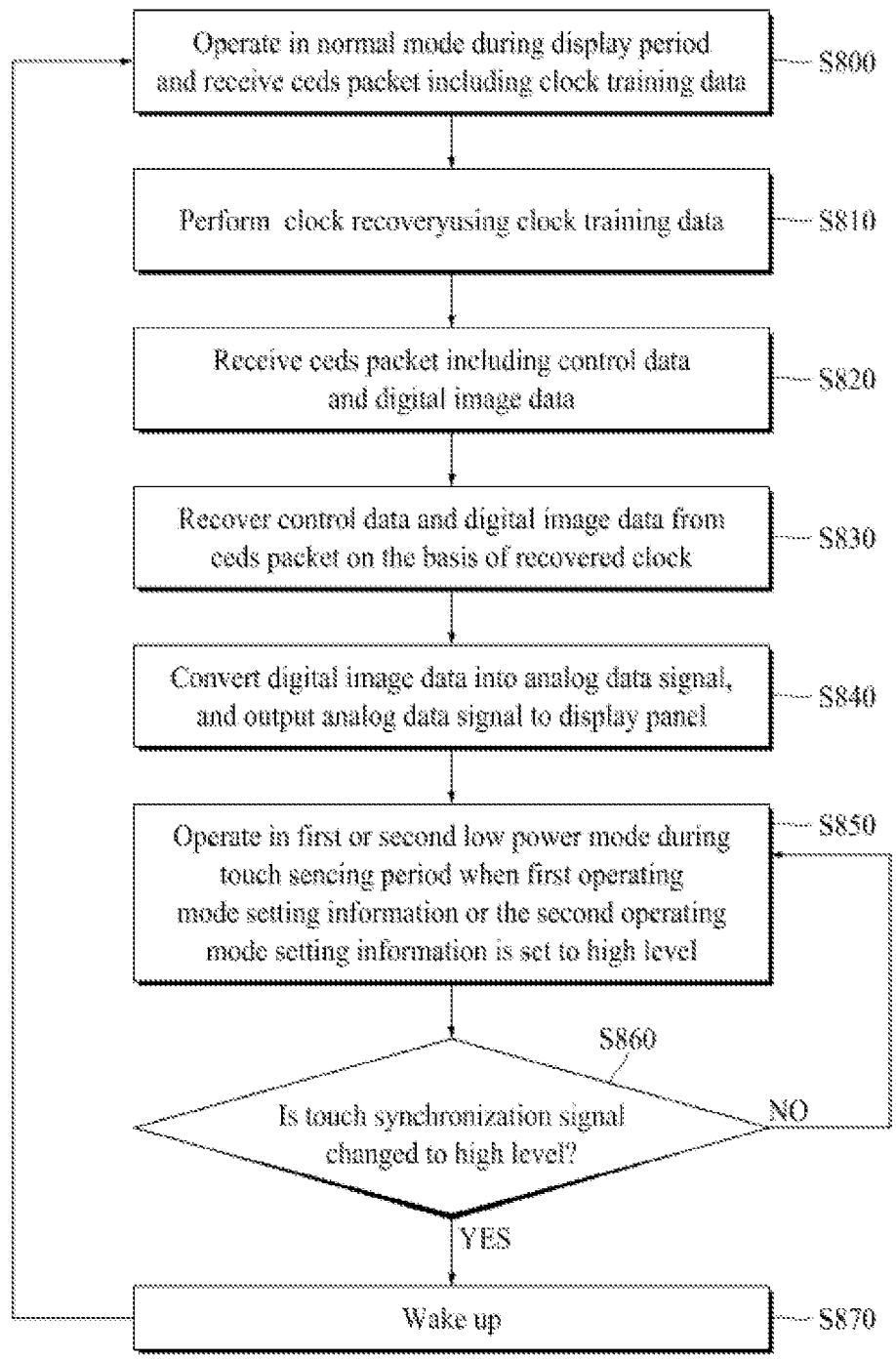
FIG. 8 is a flowchart illustrating a display driving method according to one embodiment of the present disclosure.

FIG. 8 is a flowchart illustrating a display driving method according to one embodiment of the present disclosure. The display driving method shown in FIG. 8 may be performed by the source driver IC SDIC of the display driving device shown in FIG. 2.

First, during a display period DP of one frame period, the source driver IC SDIC operates in a normal mode to receive a CEDS packet including clock training data from a timing controller (S800). In one embodiment, when a touch synchronization signal Tsync received from the timing controller is at a high level, the source driver IC SDIC may recognize the display period DP.

The source driver IC SDIC recovers a clock using the clock training data to fix a frequency and a phase (S810), and when the recovery of the clock is completed, the source driver IC SDIC receives the CEDS packet including control data and digital image data from the timing controller (S820). The source driver IC SDIC recovers the control data and the digital image data from the CEDS packet on the basis of the clock recovered in operation S810 (S830). In one embodiment, the control data includes at least one among a polarity control signal POL, a source start pulse SSP, a source sampling clock SSC, a source output enable signal SOE, and first operating mode setting information and second operating mode setting information for setting an operating mode of the source driver IC SDIC.

In this case, the first operating mode setting information represents information for operating the source driver IC SDIC in the first low power mode by deactivating an analog data processing unit of the source driver IC SDIC during a touch sensing period TP, and the second operating mode setting information represents information for operating the source driver IC SDIC in the second low power mode by deactivating a digital data processing unit and the analog data processing unit of the source driver IC SDIC during the touch sensing period TP.

When the recovery of the control data and the digital image data is completed, the source driver IC activates the digital data processing unit and the analog data processing unit, converts the digital image data into an analog data signal on the basis of the polarity control signal POL, the source start pulse SSP, the source sampling clock SSC, and the source output enable signal SOE which are acquired in operation S820, and outputs the analog data signal to a display panel (S840).

During the touch sensing period TP after the display period DP is terminated, when the first operating mode setting information is set to a high level or the second operating mode setting information is set to a high level, which are acquired in operation S820, the source driver IC SDIC deactivates at least one of the digital data processing unit and the analog data processing unit to operate in the first or second low power mode (S850).

Specifically, when the first operating mode setting information of a high level is obtained in operation S820, the source driver IC SDIC deactivates the analog data processing unit to operate in the first low power mode.

Alternatively, when the second operating mode setting information of a high level is obtained in operation S820, the source driver IC SDIC deactivates both the analog data processing unit and the digital data processing unit to operate in the second low power mode.

Thereafter, while operating in the first or second low power mode, the source driver IC SDIC monitors whether a touch synchronization signal Tsync, which is transmitted from the timing controller, is changed to a high level (S860), and when the touch synchronization signal Tsync is changed to a high level, the source driver IC SDIC determines that the display period DP arrives, wakes up (S870), and then returns to operation S800 to repeat the process of operating in the normal mode. Otherwise, when the touch synchronization signal Tsync is maintained at the low level in operation S860, the first or second low power mode is maintained according to operation S850.

In the above-described embodiment, although the source driver IC (SDIC) has been described as waking-up using the touch synchronization signal Tsync while operating in the first or second low power mode, in another embodiment, when a separate wake-up control signal is received from the timing controller, the source driver IC SDIC may wake-up to operate in the normal mode. According to the above-described embodiment, the source driver IC may additionally include a separate input pin for receiving a separate wake-up control signal.

In the present embodiment, the reason why the source driver IC SDIC receives the wake-up control signal from the timing controller through the separate input pin is that, when the source driver IC SDIC operates in the second low power mode, the source driver IC SDIC does not perform the clock training during the touch sensing period TP such that, even when the display period DP starts, a predetermined time is inevitably required until the image data is output. Therefore, when the wake-up control signal is received through the separate input pin, even during the touch sensing period TP, the source driver IC SDIC may wake-up to be changed from the second low power mode to the normal mode, thereby activating the digital data processing unit and resuming the clock training to process the image data at the same time as the start of the display period DP.

Meanwhile, in the above-described embodiment, although the source driver IC SDIC has been described as receiving both the first and second low power mode setting information from the timing controller, in another embodiment, the source driver IC SDIC may receive the first low power mode setting information from the timing controller and receive the second low power mode setting information from a touch controller.

According to the present embodiment, the second operating mode setting information may be included in readout IC control data for controlling the readout IC ROIC, the touch controller may transmit the readout IC control data including the second operating mode setting information to the readout IC ROIC, and the readout IC ROIC may acquire the second operating mode setting information from the readout IC control data to transmit the acquired second operating mode setting information the source driver IC SDIC.

Specifically, the touch controller may transmit the second operating mode setting information to the readout IC ROIC through the MOSI line according to the SPI protocol, and the readout IC ROIC transmits the received second operating mode setting information to the source driver IC SDIC. In this case, the second operating mode setting information may be set to a high level when the source driver IC SDIC should operate in the second low power mode, and the second operating mode setting information may be set to a low level when the source driver IC SDIC should operate in the normal mode.

In another embodiment, although the timing controller transmits the second operating mode setting information to the source driver IC SDIC, when a LOCK signal fed back from the source driver IC SDIC is at a high level, the timing controller may determine that the source driver IC SDIC does not operate in the second low power mode and then request the touch controller to set the source driver IC SDIC to the second low power mode. According to the above request, the touch controller may transmit the readout IC control data, which is for controlling the readout IC ROIC, including the second operating mode setting information to the readout IC ROIC.

Meanwhile, in the above-described embodiment, the source driver IC SDIC has been described as operating in the first low power mode or the second low power mode during only the touch sensing period TP.

However, in another embodiment, the source driver IC SDIC may operate in the first low power mode even during the display period DP. Specifically, when a still image is displayed over a plurality of frames or a frame rate of image data is changed from a first frame rate to a second frame rate that is lower than the first frame rate, the source driver IC SDIC may operate in the first low power mode during the display period DP.

According to the present embodiment, during the display period DP, the timing controller sets third operating mode setting information for operating the source driver IC SDIC in the first low power mode to a high level, includes the third operating mode setting information in the control data CP of the CEDS packet, and then transmits the CEDS packet. When the third operating mode setting information is included in the control data CP of the CEDS packet received from the timing controller and is set to a high level, the source driver IC SDIC deactivates the analog data processing unit 520 during the display period DP to operate in the first low power mode.

In accordance with the present disclosure, during a touch sensing period, since a source driver IC may operate in a first low power mode in which an analog data processing unit is deactivated or in a second low power mode in which both of a digital data processing unit and the analog data processing unit are deactivated, it is possible to prevent consumption of a static current and a dynamic current which are generated in the source driver IC during the touch sensing period so that power consumption of the source driver IC may be reduced.

In addition, in accordance with the present disclosure, even during a display period, when a still image is displayed or when a frame rate of a second frame is lower than a frame rate of a first frame, the source driver IC may operate in the first low power mode so that, even during the display period, the power consumption of the source driver IC may be reduced.

In addition, in accordance with the present disclosure, since a timing controller cannot transmit clock training data during the touch sensing period, the source driver IC cannot receive the clock training data during the touch sensing period even when operating in the first low power mode so that a reduction in power consumption of the source driver IC may be maximized.

What is claimed is:

1. A display driving device comprising:
 a source driver IC configured to operate in a first low power mode in which an analog data processing circuit is deactivated, or operate in a second low power mode in which both of the analog data processing circuit and a digital data processing circuit are deactivated, during a touch sensing period of a first frame;
 a readout IC configured to supply touch sensor driving signals to touch sensors during the touch sensing period, and receive touch sensing data from the touch sensors according to the touch sensor driving signals; and
 a timing controller configured to generate, during a display period, a clock embedded data signaling (CEDS) packet including clock training data, control data, and image data, and transmit the CEDS packet to the source driver IC,
  wherein, when the source driver IC operates in the first low power mode or the second low power mode during the touch sensing period, the timing controller sets a first voltage (VCEDN) and a second voltage (VCEDP) for generating the clock training data to the same level so that an input of the source driver IC becomes a high-impedance (Hi-Z) state or the clock training data is consistently maintained at a predetermined level to prevent the clock training data from being transmitted.

2. The display driving device of claim 1, wherein:
 during a display period of the first frame, the source driver IC operates in a normal mode in which the digital data processing circuit and the analog data processing circuit are activated to output image data to a display panel; and
 during the display period, the source driver IC receives the CEDS packet from the timing controller and outputs the image data to the display panel according to a clock recovered on the basis of the clock training data.

3. The display driving device of claim 1, wherein the control data includes first operating mode setting information for setting the first low power mode or second operating mode setting information for setting the second low power mode, and
 wherein, when the first operating mode setting information is a high level, the source driver IC deactivates the analog data processing circuit to operate in the first low power mode.

4. The display driving device of claim 1, wherein the control data includes first operating mode setting information for setting the first low power mode or second operating mode setting information for setting the second low power mode, and
 wherein, when the second operating mode setting information is a high level, the source driver IC deactivates the analog data processing circuit and the digital data processing circuit to operate in a second low power mode.

5. The display driving device of claim 1, wherein:
 the readout IC acquires second operating mode setting information for setting an operating mode of the source driver IC for the touch sensing period from readout IC control data and transmits the second operating mode setting information to the source driver IC, the readout IC control data being transmitted during a display period from a touch controller for controlling an operation of the readout IC; and when the second operating mode setting information transmitted from the readout IC is a high level, the source driver IC operates in the second low power mode.

6. The display driving device of claim 5, wherein the touch controller operates as a master and the readout IC operates as a slave according to a serial peripheral interface (SPI) protocol, and the touch controller transmits the readout IC control data including the second operating mode setting information to the readout IC through a master output slave input (MOSI) line.

7. The display driving device of claim 1, wherein, when image data included in a second frame is still image data or when a frame rate of the second frame is lower than a frame rate of the first frame, the source driver IC deactivates the analog data processing circuit to operate in the first low power mode during a display period of the second frame.

8. The display driving device of claim 7, wherein:
control data included in the CEDS packet, which is transmitted from a timing controller during a display period of the second frame, includes third operating mode setting information for setting an operating mode of the source driver IC for the display period of the second frame; and
when the third operating mode setting information is a high level, the source driver IC deactivates the analog data processing circuit during the display period of the second frame to operate in a first low power mode.

9. The display driving device of claim 1, wherein the source driver IC and the readout IC are integrated into a single IC.

10. The display driving device of claim 1, wherein the digital data processing circuit includes:
a data receiver configured to receive the CEDS packet from the timing controller through a differential signal line pair;
a recovery circuit configured to recover a clock, the control data, and the image data from the received CEDS packet;
a data sampling circuit configured to sample the recovered image data on the basis of the recovered control data and the recovered clock; and
a digital-to-analog converter configured to convert the sampled image data into an analog data signal.

11. The display driving device of claim 10, wherein the analog data processing circuit includes an output buffer which outputs the analog data signal to a display panel.

12. The display driving device of claim 1, wherein:
the source driver IC comprises i source driver ICs (i is a natural number of two or more);
when the clock is recovered using the clock training data and thus a phase and a frequency are fixed, a (i−1)th source driver IC generates a high-level LOCK signal and transmits the high-level LOCK to an ith source driver IC, and when the phase and the frequency of the clock are not fixed, the (i−1)th source driver IC generates a low-level LOCK signal and transmits the low-level LOCK signal to the ith source driver IC; and
when the low-level LOCK signal is received from the ith source driver IC during the touch sensing period, the timing controller determines that the i source driver ICs are operating in the second low power mode.

13. The display driving device of claim 12, wherein:
when the high-level LOCK signal is received from the ith source driver IC, the timing controller determines that the i source driver ICs are not operating in the second low power mode and requests a touch controller, which controls an operation of the readout IC, to set the i source driver ICs to the second low power mode; and
the touch controller generates readout control data including high-level second operating mode setting information for setting the i source driver ICs to the second low power mode and transmits the readout control data to the readout IC, the readout control data being for controlling the readout IC.

14. A display driving method comprising:
during a display period of a first frame, driving a source driver IC in a normal mode in which a digital data processing circuit and an analog data processing circuit are activated to output image data to a display panel; and
during a touch sensing period of the first frame, driving the source driver IC in a first low power mode in which the analog data processing circuit is deactivated or in a second low power mode in which the analog data processing circuit and a digital data processing circuit are deactivated,
wherein the source driver IC receives a clock embedded data signaling (CEDS) packet including clock training data for clock synchronization between a timing controller and the source driver IC, control data for controlling the source driver IC, and the image data from the timing controller during the display period, and
wherein, when the source driver IC operates in the first low power mode or the second low power mode during the touch sensing period, the timing controller sets a first voltage (VCEDN) and a second voltage (VCEDP) for generating the clock training data to the same level so that an input of the source driver IC becomes a high-impedance (Hi-Z) state or the clock training data is consistently maintained at a predetermined level to prevent the clock training data from being transmitted.

15. The display driving method of claim 14, wherein, when first operating mode setting information included in the control data is a high level, the source driver IC deactivates the analog data processing circuit to operate in the first low power mode during the touch sensing period, and when second operating mode setting information included in the control data is a high level, the source driver IC deactivates the analog data processing circuit and the digital data processing circuit to operate in the second low power mode during the touch sensing period.

16. The display driving method of claim 14, wherein:
a readout IC for touch sensing acquires second operating mode setting information for setting an operating mode of the source driver IC for the touch sensing period from readout IC control data and transmits the second operating mode setting information to the source driver IC, the readout IC control data being transmitted during the display period from a touch controller for controlling an operation of the readout IC; and
when the second operating mode setting information transmitted from the readout IC is a high level, the source driver IC operates in the second low power mode during a touch sensing period of the first frame.

17. The display driving method of claim 14, further comprising, when the image data included in a second frame is still image data or when a frame rate of the second frame is lower than a frame rate of the first frame, driving the source driver IC in the first low power mode in which the analog data processing circuit is deactivated during a display period of the second frame.

\* \* \* \* \*